US010643454B1

(12) United States Patent
Santamore

(10) Patent No.: US 10,643,454 B1
(45) Date of Patent: May 5, 2020

(54) HANDWASHING SYSTEM AND METHODS OF USE

(71) Applicant: Megan Santamore, Bel Air, MD (US)

(72) Inventor: Megan Santamore, Bel Air, MD (US)

(*) Notice: Subject to any disclaimer, the term of this patent is extended or adjusted under 35 U.S.C. 154(b) by 0 days.

(21) Appl. No.: 16/248,095

(22) Filed: Jan. 15, 2019

Related U.S. Application Data

(60) Provisional application No. 62/778,152, filed on Dec. 11, 2018.

(51) Int. Cl.
G01S 15/04 (2006.01)
G08B 21/24 (2006.01)

(52) U.S. Cl.
CPC ............ *G08B 21/245* (2013.01); *G01S 15/04* (2013.01)

(58) Field of Classification Search
None
See application file for complete search history.

(56) References Cited

U.S. PATENT DOCUMENTS

| 9,536,415 | B2* | 1/2017 | De Luca | G08B 21/245 |
| 10,495,544 | B1* | 12/2019 | Billing | G07C 5/008 |
| 2004/0090333 | A1* | 5/2004 | Wildman | G06F 19/3418 |
| | | | | 340/573.1 |
| 2009/0112538 | A1* | 4/2009 | Anderson | G09B 23/28 |
| | | | | 703/6 |
| 2009/0112541 | A1* | 4/2009 | Anderson | G09B 19/0076 |
| | | | | 703/11 |
| 2009/0219131 | A1 | 9/2009 | Barnett et al. | |
| 2009/0265583 | A1* | 10/2009 | Bouse | G05B 19/0425 |
| | | | | 714/37 |
| 2010/0134296 | A1 | 6/2010 | Hwang | |
| 2010/0188228 | A1* | 7/2010 | Hyland | G08B 21/245 |
| | | | | 340/573.1 |
| 2010/0318848 | A1* | 12/2010 | Yang | G01R 31/31713 |
| | | | | 714/30 |
| 2011/0057799 | A1* | 3/2011 | Taneff | G08B 21/245 |
| | | | | 340/573.1 |
| 2011/0270762 | A1* | 11/2011 | Lin | G06Q 20/10 |
| | | | | 705/64 |
| 2012/0062382 | A1* | 3/2012 | Taneff | G08B 21/245 |
| | | | | 340/573.1 |
| 2014/0266692 | A1* | 9/2014 | Freedman | G08B 21/245 |
| | | | | 340/539.11 |
| 2014/0375457 | A1* | 12/2014 | Diaz | G08B 21/245 |
| | | | | 340/573.1 |
| 2015/0134357 | A1 | 5/2015 | Davis et al. | |
| 2015/0161874 | A1* | 6/2015 | Thyroff | G08B 21/245 |
| | | | | 340/539.11 |
| 2015/0216369 | A1* | 8/2015 | Hamilton | A47K 5/1217 |
| | | | | 222/1 |
| 2017/0270770 | A1* | 9/2017 | Marshall | B65G 21/18 |
| 2018/0047277 | A1* | 2/2018 | Thyroff | G08B 21/24 |
| 2018/0234746 | A1* | 8/2018 | Uchida | G08B 21/187 |
| 2019/0001006 | A1* | 1/2019 | Rodenbeck | A61L 2/18 |

(Continued)

*Primary Examiner* — Steven Lim
*Assistant Examiner* — Muhammad Adnan
(74) *Attorney, Agent, or Firm* — Wei & Sleman LLP

(57) ABSTRACT

A system for ensuring proper handwashing includes at least one microcontroller, a plurality of sensors in communication with the at least one microcontroller, each of the plurality of sensors being disposed at a different location from others of the plurality of sensors, an identification module, a display, and a storage device in communication with the at least one microcontroller.

9 Claims, 3 Drawing Sheets

(56) References Cited

U.S. PATENT DOCUMENTS

| | | | |
|---|---|---|---|
| 2019/0179281 A1* | 6/2019 | Fang | G05B 19/0428 |
| 2019/0186911 A1* | 6/2019 | do Amaral Assy | G08B 21/182 |
| 2019/0210387 A1* | 7/2019 | Otsuka | G06K 9/6251 |
| 2019/0212352 A1* | 7/2019 | Apker | G01N 35/00623 |
| 2019/0294987 A1* | 9/2019 | Luan | G08B 21/187 |
| 2019/0304286 A1* | 10/2019 | Lee | G05B 23/02 |
| 2019/0304287 A1* | 10/2019 | Lee | G08B 21/18 |

* cited by examiner

HANDWASHING SYSTEM AND METHODS OF USE

CROSS-REFERENCE TO RELATED APPLICATIONS

This application claims priority to U.S. Provisional Application Ser. No. 62/778,152, filed Dec. 11, 2018, entitled "SMARTTRACK HANDWASHING SYSTEM," the contents of which are fully incorporated as if fully set forth herein.

FIELD OF THE DISCLOSURE

The present disclosure relates to systems for the washing of hands. More particularly, the present disclosure relates to devices, systems and methods for ensuring that individuals properly wash their hands to reduce the possibility of infections.

BACKGROUND OF THE DISCLOSURE

Most germs that cause serious infections in healthcare are spread by people's actions. Hand hygiene is a great way to prevent infections. According to the CDC, studies show that on average, healthcare providers clean their hands less than half of the times they should. This contributes to the spread of healthcare-associated infections that affect 1 in 25 hospital patients on any given day. Every patient is at risk of getting an infection while they are being treated for another illness, and even healthcare providers are at risk of getting an infection while they are treating patients. Preventing the spread of germs is especially important in hospitals and other facilities such as dialysis centers and nursing homes.

Educational efforts to promote proper hand hygiene typically fall short of their intended goal. First, many people do not take the educational courses or the threat of infection seriously. Second, even those who wash their hands, often do not properly do so, by using improper techniques or washing their hands for too short a time, a duration that is insufficient to limit the spread of infection. Finally, educational courses must be continuously presented every few months due to hospital staff turnover, or forgetfulness. In short, even properly educating healthcare personnel does not guarantee compliance.

SUMMARY OF THE DISCLOSURE

In some embodiments, a system for ensuring proper handwashing includes at least one microcontroller, a plurality of sensors in communication with the at least one microcontroller, each of the plurality of sensors being disposed at a different location from others of the plurality of sensors, an identification module, a display, and a storage device in communication with the at least one microcontroller.

In some embodiments, a method of washing hands includes providing a handwashing system including at least one microcontroller, a plurality of sensors in communication with the at least one microcontroller, an RFID card reader, a display, and a storage device in communication with the at least one microcontroller, confirming an identity of a user via the RFID card reader, prompting the user to wet the user's hands, detecting the presence of the user's hands adjacent a first location via a first of the plurality of sensors, detecting the presence of the user's hands adjacent a second location via a second of the plurality of sensors, and detecting the presence of the user's hands adjacent a third location via a third of the plurality of sensors.

BRIEF DESCRIPTION OF THE DISCLOSURE

Various embodiments of the presently disclosed devices, methods and systems are disclosed herein with reference to the drawings, wherein.

Various embodiments or the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to handwashing systems, conventional devices and techniques suffer from some shortcomings as discussed above.

There therefore is a need for further improvements to handwashing systems and their methods of use. Among other advantages, the present disclosure may satisfy one or more of these needs.

Figure 1:
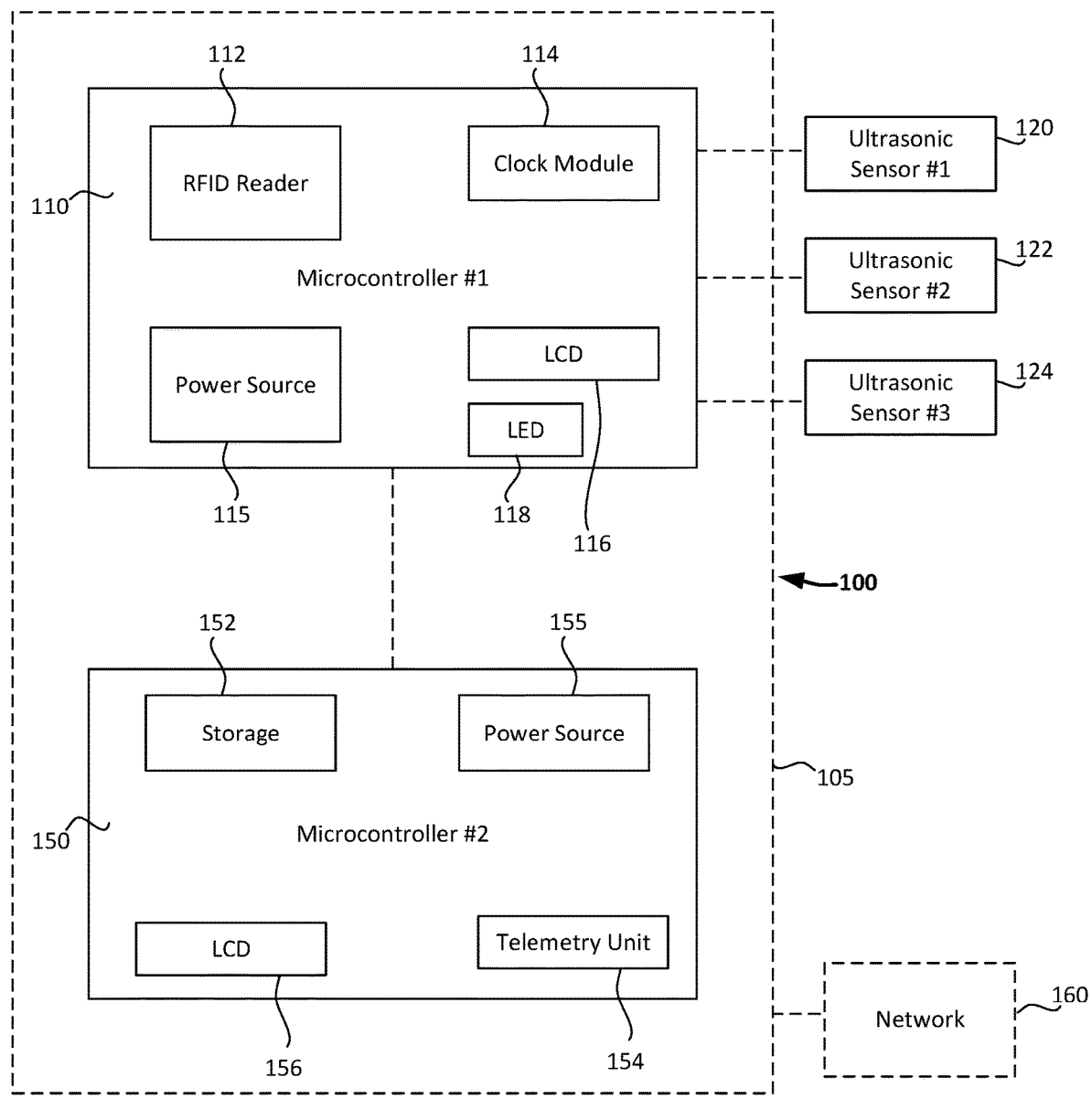
FIG. 1 is a diagram showing several components of a handwashing system.

Handwashing system 100 is intended to ensure proper handwashing and may generally include electronic components disposed within a plastic or metallic housing 105. As shown in FIG. 1, the system may further include one or more microcontrollers. It will be understood that this embodiment is merely exemplary and that any of the components discussed herein may be replaced or complemented by other components. Additionally, though two microcontrollers are used in this embodiment, all of the components may be added to a single microcontroller, or divided amongst more than two microcontrollers. In this embodiment, two microcontrollers are used, a first microcontroller 110 in communication with an RFID reader 112, a clock module 114, a power source 115 (e.g., a battery or electrical outlet), a display (e.g., LCD) 116, a series of signaling devices or lights (e.g., LEDs) 118, and a plurality of sensors 120, 122, 124. A second microcontroller 150 in communication with the first microcontroller 110 is provided. Second microcontroller 150 may include a storage 152, such as a microSD card adapter, a second display (e.g., LCD) 156, a second power source 155, and a telemetry unit 154 capable of transmitting data from storage 152 to a server or a network 160. As discussed, the system may include a single microcontroller. Additionally, systems having one or more microcontrollers may include a single power source, or a single LCD.

In one example, the handwashing system 100 may include two Arduino microcontrollers, an Arduino Mega serving as the first microcontroller 110 and an Arduino Uno serving as the second microcontroller 150. The two microcontrollers are arranged in a master/slave communication to send information taken from the sensors 120 and other components, such as the date, time, steps completed, and time taken for each step from the first microcontroller 110 to the second microcontroller 150, the second microcontroller 150 having storage capabilities to collect, record and store the data.

Figure 2:
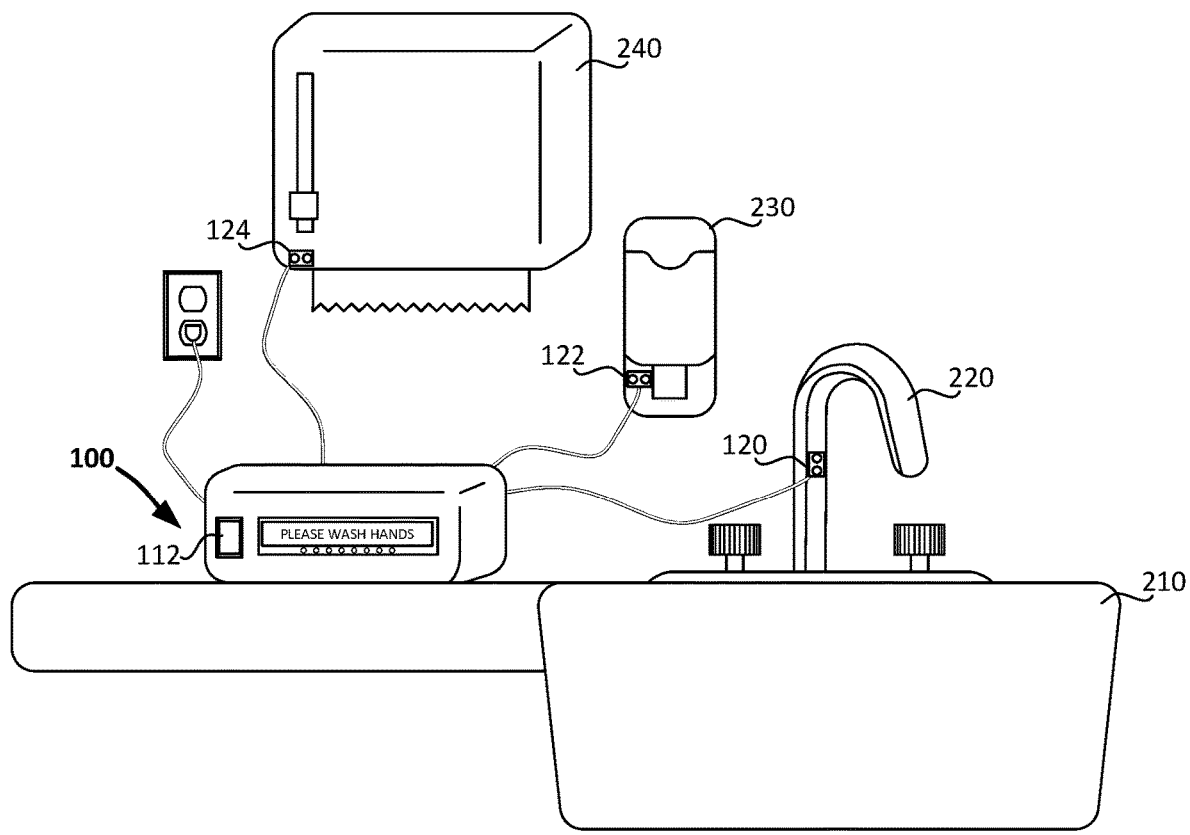
FIG. 2 is a schematic perspective view showing the use of a handwashing system.

As shown in FIG. 2, handwashing system 100 is intended to be disposed adjacent a handwashing station where hygiene is important (e.g., a sink in a patient's room in a hospital). Handwashing system 100 is shown plugged into an electrical outlet, although it will be understood that battery powered systems are also possible. In this example, the system 100 is in communication with three ultrasonic sensors 120, 122, 124 capable of sensing the presence of an object (e.g., the user's hands). First ultrasonic sensor 120 is disposed on, adjacent or below a faucet 220 or sink 210 and configured to sense the presence of an object above the sink. Second ultrasonic sensor 122 is disposed on, adjacent or below a soap or soap dispenser 230, and third ultrasonic sensor 124 is disposed on, adjacent or below drying element 240 (e.g., paper towel dispenser, towel rack, etc.). Sensors 120,122,124 are shown being wired to system 100, but it will be appreciated that the handwashing systems and/or the sensors may be battery-powered or that the wires may be hidden behind the walls or under cabinet surfaces. Instead of ultrasonic sensors, motion sensors, proximity sensors or infrared sensors (e.g., infrared point sensors) may be used.

System 100 may be used to ensure that the proper handwashing protocol is followed. In some examples, the proper handwashing protocol includes the following five steps:

(1) Wet hands with clean, running water, turn off the tap, and apply soap.

(2) Lather hands by rubbing them together with the soap.

(3) Scrub the hands for at least 20 seconds.

(4) Rinse hands well under clean, running water.

(5) Dry hands using a clean towel or air dry them.

Failure to perform any one of these steps properly may result in unsuccessfully removing bacteria and other pathogens from the hands, and increases the risk of infection, for example, to patients. However, previous solutions overlook the importance of these steps, and instead choose to focus only on: if an attempt to wash hands has been made and not the quality of the handwashing. Conversely, the instant system may guide the user through the series of steps and time each step to ensure that it is completed properly.

Figure 3:
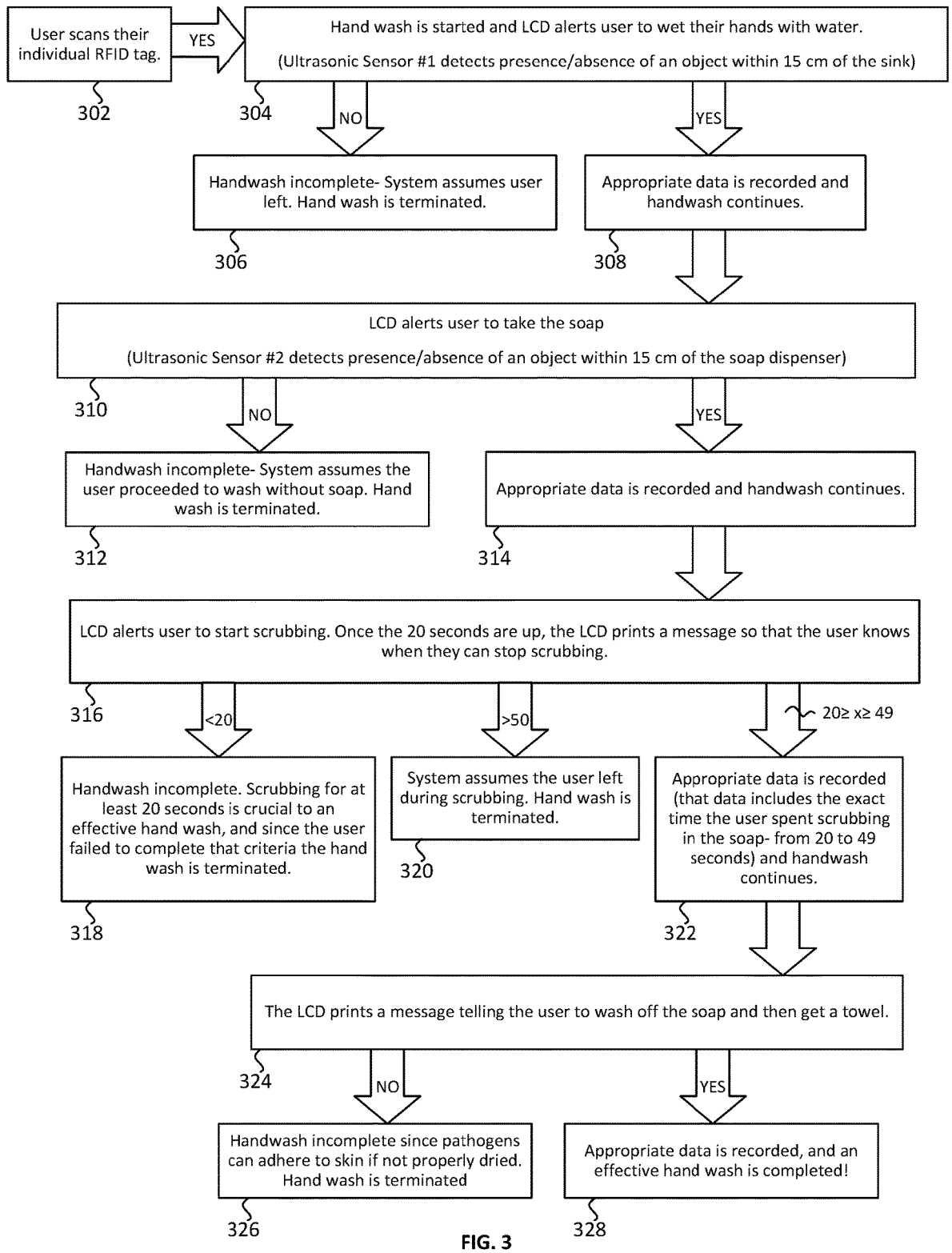
FIG. 3 is a flowchart showing certain steps of a method utilizing the handwashing system of FIGS. 1 and 2.

To ensure that users follow the recommended handwashing guidelines for correct washing techniques, the method of FIG. 3 may be employed. First, each user may be assigned an individual RFID tag. This tag may be in addition to or made unitarily with their employee identification badge. Each tag may be mapped to a given employee and include identifying information such as the employee's name, position and responsibilities along with any other relevant information. The user may begin by scanning their tag by placing it against RFID reader 112 of the first microcontroller in step 302. At scanning, the system may note the identity of the employee and the exact time of the scanning. LCD 116 may be used to prompt the user to scan their tag and/or may confirm proper scanning of the tag by displaying the user's name, and/or alert the user that a tag was not properly scanned. With the tag properly scanned, the system may begin the handwashing protocol and LCD 116 may alert the user to begin wetting their hands with water. In some examples, LEDs 118 may also signal the various steps of the process. For example, a first of LEDs 118 may be used to signal the initial wetting stage. Alternatively, all of LEDs 118 may turn a first color to signal the initial wetting stage (e.g., red).

The first ultrasonic sensor 120 may detect the presence or absence of an object (i.e., the user's hands) at a predetermined location. For example, the sensor 120 may detect the presence/absence of an object within 15 cm of the sink or faucet (step 304). If no hands are detected, the handwash protocol ends and the system may note that no handwashing was initiated (step 306). Alternatively, if within five seconds, an object is detected where they would be wetted by water from the faucet, the data is recorded and the handwash protocol may continue (step 308). Next, LCD 116 may alert the user to take the soap or use the soap dispenser (step 310). For example, second ultrasonic sensor 122 may detect the presence/absence of an object within 15 cm of the soap dispenser. Again, failure to detect an object in this step results in a notation of incomplete handwashing or an improper washing that used only water and not soap (step 312). Alternatively, proper detection results in data being recorded and continuation of the protocol (step 314). In some examples, a second of LEDs 118 may be used to signal the scrubbing stage. Alternatively, all of LEDs 118 may turn a second color to signal the scrubbing stage (e.g., yellow). LCD 116 may then alert the user to start scrubbing and to continue scrubbing for a predetermined duration (step 316). In at least some examples, the proper scrubbing duration is approximately 20 seconds. Alternatively, the proper scrubbing duration may be adjusted based on the literature for a given application. Once the scrubbing duration elapses, LCD 116 may display a message so that the user knows when they can stop scrubbing. Again, second ultrasonic sensor 122 may continue detecting the presence/absence of an object in the desired scrubbing area, and system (e.g., the clock module) may be used to determine the approximate duration of scrubbing by the user. Scrubbing for a duration that is less than the predetermined proper scrubbing duration will result in an incomplete handwashing notation (step 318) as scrubbing for at least 20 seconds is suggested to an effective hand wash. If the user failed to complete that criteria the hand wash is terminated. A measured scrubbing of greater than 50 seconds will result in the system timing out as it assumes that the user left, and a proper notation is made (step 320). If, however, a user scrubs their hands for between 20 and 49 seconds, then removes them from the vicinity of the sensor, appropriate data is recorded, the data including the exact time the user spent scrubbing with the soap from 20 to 49 seconds and the handwash protocol continues (step 322). LCD 116 may then print a message telling the user to rinse their hands for a rinsing period (e.g., 7 seconds) to wash the soap off and dry their hands (step 324). In some examples, a third of LEDs 118 may be used to signal the rinsing and drying stage. Alternatively, all of LEDs 118 may turn a third color to signal the rinsing/drying stage (e.g., green). Failure to rinse hands of soap for the rinsing period will result in an incomplete washing since pathogen may still adhere to skin if the soap is not rinsed off and the hands are not properly dried (step 326). Alternatively, by ensuring, via sensors 120 and 124, that the user has rinsed their hands of the soap and dried their hands with a towel, it may be determined that the user has successfully completed the handwashing protocol (step 328). Appropriate data of each stage may be recorded to storage 152, and LCD 116 may display a message such as "Handwashing Complete" to confirm to the user that the washing protocol has been followed and the LEDs may be turned off. Any or all of the data may be recorded to storage 152. In embodiments where the storage includes a portable element (e.g., SD cards), LCD 156 may confirm the status of the storage and display messages such as "SD CARD DETECTED," "SD CARD NOT FOUND" or "DATA RECORDING COMPLETE". In some examples, storage 152 may be retrieved and inspected after an instance of infection to determine the responsible party for the infection. Alternatively, the system may include a telemetry unit 154 that is capable of transmitting data from storage 152 to another central database.

The system may also be connected to a network 160 via WIFI, Bluetooth, or ethernet technologies to continuously upload data to a local network server or a cloud.

Thus, the system may be used to (1) ensure that a proper handwashing protocol is completed, (2) retroactively identify parties who fail to properly wash their hands, and cause an infection, and (3) identify parties who continuously fail to properly wash their hands and require additional instruction on how to properly do so, even if that failure has not yet resulted in an infection.

In one example, if a patient gets a hospital acquired infection (HAI), the collected data may be used to show who was in contact with the patient during the course of their hospital stay. A party responsible for investigating the source of the infection may go to that hospital room and retrieve the micro SD card from the device. As the device sends the time and date with every use of the system, once the SD card excel data is available it will be easy to determine if proper hand washing protocol was followed, and consequently, if a particular health care professional was responsible for transmitting the infection. Alternatively, in embodiments where the handwashing system is connected to a network, the investigator may simply log into the system and review all handwashing instances associated with a certain hospital room or a certain patient to locate the source of the infection.

Although the invention herein has been described with reference to particular embodiments, it is to be understood that these embodiments are merely illustrative of the principles and applications of the present invention. For example, though an RFID card reader is described, it will be understood that another identification module can be used to identify the individual. For example, the user may be prompted to enter their name, a username, password, and/or employee code. In other examples, the identification module includes a biometric scanner (e.g., fingerprint, facial identification hardware/software, etc.). It is therefore to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A method of identifying a source of an infection comprising:
providing a handwashing system including a display, at least one microcontroller, a storage device in communication with the at least one microcontroller, and a plurality of sensors, each of the plurality of sensors being in communication with one of the at least one microcontroller;
collecting handwashing data for users of the handwashing system by (i) confirming an identity of the user, (ii) prompting the user to wet the user's hands (iii) detecting the presence of the user's hands adjacent a first location via a first of the plurality of sensors, (iv) detecting the presence of the user's hands adjacent a second location via a second of the plurality of sensors, and (v) detecting the presence of the user's hands adjacent a third location via a third of the plurality of sensors;
noting multiple failed handwashings for a particular user of the users;
requesting additional instruction to the particular user on proper handwashing procedure;
identifying a subset of the users who wee present in a room where the infection was detected; and
reviewing the handwashing data to determine which of the subset of the users contributed to the infection.

2. The method of claim 1, further comprising the step of determining that the handwashing is incomplete if the user's hands are not detected via one of the plurality of sensors.

3. The method of claim 1, further comprising the step of measuring a scrubbing duration via the second sensor.

4. The method of claim 3, further comprising the step of confirming that the scrubbing duration is between a proper range of 20 and 49 seconds, and noting an improper washing if the scrubbing duration is outside of the proper range.

5. The method of claim 3, further comprising the step of recording data relating to the identity of the user, the scrubbing duration and whether hand washing protocol has been successfully completed to the storage device.

6. The method of claim 3, further comprising the step of recording data relating to an improper washing to the storage device.

7. The method of claim 3, further comprising the step of providing a series of LEDS, and signaling different stages of a handwashing protocol using the series of LEDs.

8. The method of claim 3, wherein providing the handwashing system includes providing the storage device in the form of an SD card, the method further comprising the step of transmitting data to the SD card, and retrieving the SD card to determine the source of the infection.

9. The method of claim 3, further comprising a step of transmitting data from the handwashing system to an external device.

* * * * *